United States Patent
Zhao et al.

(10) Patent No.: US 10,170,104 B2
(45) Date of Patent: Jan. 1, 2019

(54) ELECTRONIC DEVICE, METHOD AND TRAINING METHOD FOR NATURAL LANGUAGE PROCESSING

(71) Applicant: Sony Corporation, Tokyo (JP)

(72) Inventors: Zhiwei Zhao, Beijing (CN); Youzheng Wu, Beijing (CN)

(73) Assignee: SONY CORPORATION, Tokyo (JP)

( * ) Notice: Subject to any disclaimer, the term of this patent is extended or adjusted under 35 U.S.C. 154(b) by 53 days.

(21) Appl. No.: 15/399,046

(22) Filed: Jan. 5, 2017

(65) Prior Publication Data
US 2017/0278510 A1 Sep. 28, 2017

(30) Foreign Application Priority Data
Mar. 22, 2016 (CN) .......................... 2016 1 0166603

(51) Int. Cl.
*G06F 17/27* (2006.01)
*G10L 15/06* (2013.01)
*G10L 15/04* (2013.01)
*G10L 15/16* (2006.01)

(52) U.S. Cl.
CPC ........ *G10L 15/063* (2013.01); *G06F 17/2785* (2013.01); *G10L 15/04* (2013.01); *G10L 15/16* (2013.01)

(58) Field of Classification Search
USPC ... 704/1–10, 250–257, 270, 270.1, 275, 277
See application file for complete search history.

(56) References Cited

U.S. PATENT DOCUMENTS

| | | | |
|---|---|---|---|
| 2006/0100852 A1* | 5/2006 | Gamon | G06F 17/271 704/9 |
| 2017/0200066 A1* | 7/2017 | Wang | G06F 17/30253 |
| 2017/0235721 A1* | 8/2017 | Almosallam | G06F 17/2785 704/9 |

* cited by examiner

*Primary Examiner* — Huyen Vo
(74) *Attorney, Agent, or Firm* — Xsensus, LLP (57) ABSTRACT

Provided are an electronic device, a method and a training method for natural language processing. The electronic device for natural language processing includes a processor configured to: for each of words obtained by segmenting a sentence in a training data set, obtain an attention parameter representing correlation between the word and each of one or more words of other words in the sentence, where each of the words is represented by a real vector; and train, based on each of the words in the sentence, information on the attention parameter acquired for the word and label information of the sentence in the training data set, a neural network for sentence classification.

24 Claims, 9 Drawing Sheets

| Model | SST | TREC | TREC2 |
|---|---|---|---|
| CNN | 48.0 | 93.4 | 86.4 |
| DCNN | 48.3 | 95.6 | 89.0 |
| RNN | 43.2 | | |
| RNTN | 45.7 | | |
| DRNN | 49.8 | | |
| S-LSTM | 48.0 | | |
| ATT-CNN | 50.4 | 95.4 | 88.6 |

| Label | Sentence and Context |
|---|---|
| Position | Which city has the longest subway system in the world? |
| | which, city, the longest, subway |
| Entity | What is the name of the orc who died of fungal infections? |
| | what, name, orc, died |
| Human | Which one of left-handed baseball pitchers in the former union is called as "astronaut"? |
| | which one, baseball, pitchers, astronaut |
| Abbreviation | What is the abbreviation of an estimation system of air condition efficiency? |
| | what, abbreviation, estimation, air |
| Number | How much should the temperature be set when baking oat peach muffins? |
| | how much, should, temperature, baking |

ELECTRONIC DEVICE, METHOD AND TRAINING METHOD FOR NATURAL LANGUAGE PROCESSING

FIELD OF THE INVENTION

The embodiments of the present disclosure generally relate to the field of information processing, particularly to natural language processing, and more particularly to an electronic device and a method for natural language processing, and a corresponding training method and electronic device.

BACKGROUND OF THE INVENTION

Sentence classification is a key issue in spoken language understanding (SLU) and natural language processing (NLP). For example, a question classification, a sentiment classification, a user-intent classification and the like may be performed on a sentence. As examples of the question classification, "which city is the longest subway of the world in?" is a sentence for inquiring a geographic position, and "which one of players in the former league is called as an 'astronaut'?" is a sentence inquiring a name of a person. As examples of the sentiment classification, "This film is terrible" represents a negative sentiment and "The actor works very hard" represents a positive sentiment. As an example of the user intent classification, "I want to listen to music" indicates the intent to play music.

A conventional sentence classification method is based on a Bag-of-word model, that is, a sentence is represented as a vector of a series of characters, words and segments. For example, the sentence "This film is terrible" is segmented as "this", "film", "terrible" and the like. Upon being obtained, these vectors are inputted into a standard classification algorithm such as a maximum entropy, a support vector machine (SVM) or the like to obtain a classification result.

In recent years, a sentence classification method based on representation learning has been proposed. In the method, words in a sentence are mapped to real vectors first, and a set of the real vectors representing the sentence is then inputted to various artificial neural networks such as a convolutional neural network (CNN), a recurrent neural network (RecurrentNN) or the like, to map the sentence to a real vector. The real vector is inputted to a standard classification algorithm to obtain a classification result. Therefore, in the sentence classification based on the neural network, a real vector representation at the level of sentence is obtained first using the neural network, and a classification label of the sentence is then obtained by means of a classifier.

SUMMARY OF THE INVENTION

In the following, an overview of the present invention is given simply to provide basic understanding to some aspects of the present invention. It should be understood that this overview is not an exhaustive overview of the present invention. It is not intended to determine a critical part or an important part of the present invention, nor to limit the scope of the present invention. An object of the overview is only to give some concepts in a simplified manner, which serves as a preface of a more detailed description described later.

According to an aspect of the application, there is provided an electronic device for natural language processing. The electronic device includes a processor configured to: for each of words obtained by segmenting a sentence in a training data set, obtain an attention parameter representing correlation between the word and each of one or more words of other words in the sentence, wherein each of the words is represented by a real vector; and train, based on each of the words in the sentence, information on the attention parameter acquired for the word and label information of the sentence in the training data set, a neural network for sentence classification.

According to another aspect of the present disclosure, an electronic device for natural language processing is provided. The electronic device includes a storage and a processor. The storage stores a neural network which has been trained for sentence classification, where the neural network is trained using the above mentioned electronic device. The processor is configured to: for each of words obtained by segmenting a sentence to be classified, obtain an attention parameter representing correlation between the word and each of one or more words of other words in the sentence, wherein each of the words is represented by a real vector; and classify the sentence by using the neural network, based on each of the words in the sentence and information on the attention parameter obtained for the word.

According to another aspect of the present disclosure, a training method for natural language processing is further provided. The method includes: for each of words obtained by segmenting each of the sentences in a training data set, obtaining an attention parameter representing correlation between the word and each of one or more words of other words in the sentence, wherein each of the words is represented by a real vector; and training, based on each of the words in each of the sentences, information on the attention parameter obtained for the word and label information of the sentence in the training data set, a neural network for sentence classification.

According to another aspect of the present disclosure, a method for natural language processing is further provided. The method includes: for each of words obtained by segmenting a sentence to be classified, obtaining an attention parameter representing correlation between the word and each of one or more words of other words in the sentence, wherein each of the words is represented by a real vector; and classifying the sentence by using a neural network which has been trained for sentence classification, based on each of the words in the sentence and information on the attention parameter obtained for the word, wherein the neural network is trained using the above mentioned training method.

Computer program codes and a computer program product for implementing a training method for natural language processing and a method for natural language processing and a computer-readable storage medium on which the computer program codes for implementing the methods described above are recorded are further provided according to other aspects of the present disclosure.

With the electronic device and the method according to the present disclosure, global information of a sentence is introduced on the basis of the convolutional neural network, thereby reflecting a semantic of the sentence more completely and improving the performance of sentence classification.

These and other advantages of the present invention will be more apparent by illustrating in detail a preferred embodiment of the present invention in conjunction with accompanying drawings below.

BRIEF DESCRIPTION OF THE DRAWINGS

To further set forth the above and other advantages and features of the present invention, detailed description will be made in the following taken in conjunction with accompanying drawings in which identical or like reference signs designate identical or like components. The accompanying drawings, together with the detailed description below, are incorporated into and form a part of the specification. It should be noted that the accompanying drawings only illustrate, by way of example, typical embodiments of the present invention and should not be construed as a limitation to the scope of the invention. In the accompanying drawings.

DETAILED DESCRIPTION OF EMBODIMENTS

An exemplary embodiment of the present invention will be described hereinafter in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. Furthermore, it should also be understood that although the development work may be very complicated and time-consuming, for those skilled in the art benefiting from the present disclosure, such development work is only a routine task.

Here, it should also be noted that in order to avoid obscuring the present invention due to unnecessary details, only a device structure and/or processing steps closely related to the solution according to the present invention are illustrated in the accompanying drawing, and other details having little relationship to the present invention are omitted.

<First Embodiment>

Figure 1:
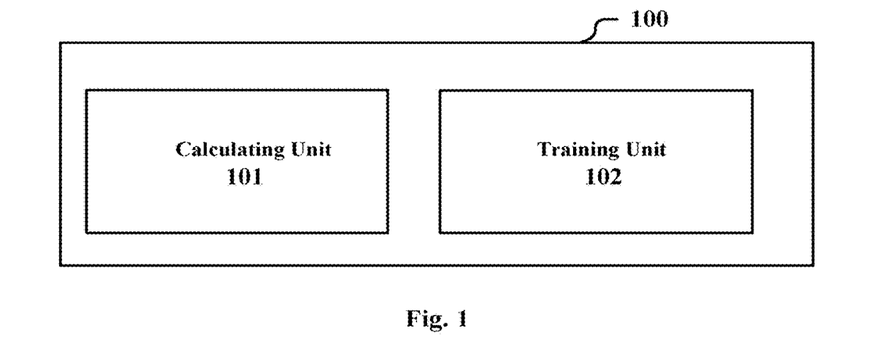
FIG. 1 illustrates a functional structure block diagram of an electronic device for natural language processing according to an embodiment of the present disclosure.

FIG. 1 illustrates a functional structure block diagram of an electronic device 100 for natural language processing according to an embodiment of the present disclosure. The electronic device 100 includes: a calculating unit 101, configured to, for each of words obtained by segmenting a sentence in a training data set, obtain an attention parameter representing correlation between the word and each of one or more words of other words in the sentence, wherein each of the words is represented by a real vector; and a training unit 102, configured to train, based on each of the words in the sentence, information on the attention parameter acquired for the word and label information of the sentence in the training data set, a neural network for sentence classification. For example, each of the calculating unit 101 and the training unit 102 can be implemented in a way of executing the corresponding computer instructions by a processor. In practical, the calculating unit 101 and the training unit 102 can also be implemented with a programmable logical device, hardware or firmware.

The neural network described herein may include various neural networks such as a convolutional neural network, a recurrent neural network, a recursive neural network and the like. Hereinafter, the convolutional neural network (CNN) is taken as an example for description, and it should be understood that the present disclosure is not limited thereto In the training data set, a category label of each sentence can be obtained in a way of manual annotation. The category does not have wide sense and only relates to different tasks. The sentence and the category label corresponding to the sentence may be stored in the same file, with a format that the category label is stored at the head of a row, and the corresponding sentence is stored immediately following the category label, for example.

The sentence is segmented into a plurality of words, each of which is represented by a real vector. The real vector can be obtained by means of various mapping tools or word embedding techniques, which already exist or are to be developed. The mapping tools or the word embedding techniques include but are not limited to word2vec, GloVe, C&W and the like. It should be understood that, the way of obtaining the real vector may not affect the application of the present disclosure. In other words, the technical solutions of the present disclosure can be applied to real vector representation obtained in any way.

Figure 2:
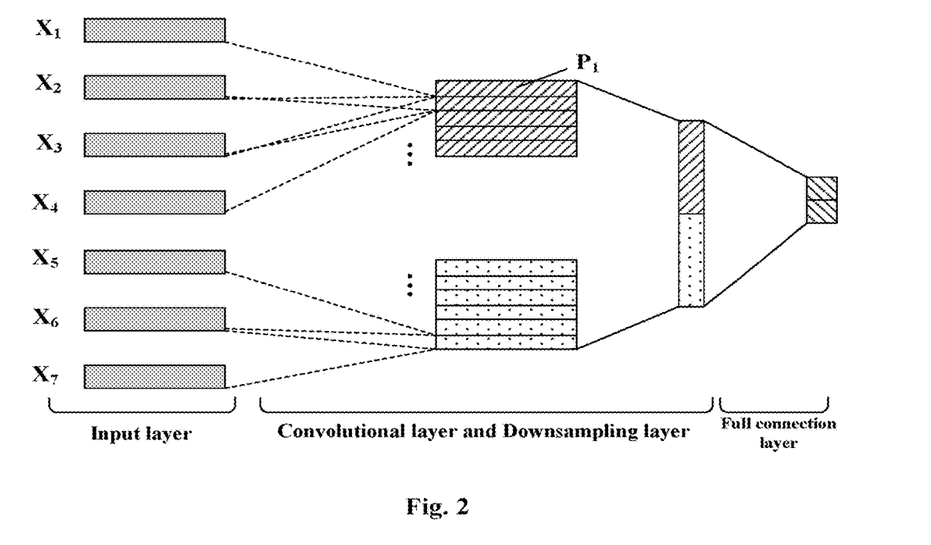
FIG. 2 illustrates an example of a model used in conventional sentence classification based on a convolutional neural network.
Figure 3:
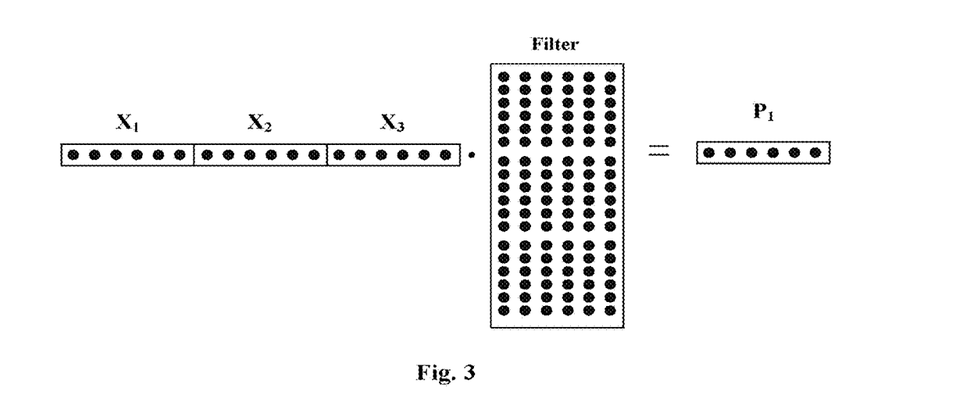
FIG. 3 illustrates a schematic diagram of an operation of a convolutional layer in a convolutional neural network.

FIG. 2 illustrates an example of a model used in a convention sentence classification based on CNN. In the example, seven words are obtained after sentence segmentation, the seven words are respectively represented by real vectors X1, X2, . . . , X7. The real vectors are inputted into a convolutional neural network, and are then processed by a convolutional layer and a downsampling layer of the convolutional neural network, to transform from word-level vectors into phrase-level vectors (as shown by an oblique-line block and a dot block arranged transversally in FIG. 2), and further transform into sentence-level vectors (as shown by an oblique-line block and a dot block arranged vertically in FIG. 2). The sentence-level vectors are inputted to a full connection layer to obtain a classification result. It should be noted that, although only one convolutional layer and one downsampling layer are shown in FIG. 2, the present disclosure is not limited thereto and is not limited to the arrangement order. In addition, arrangement for the full connection layer is not limited to the arrangement shown in FIG. 2. For example, no hidden layer or any number of hidden layers may be further arranged following the sentence-level vectors. The convolutional neural network may learn by for example the back propagation algorithm. FIG. 3 illustrates a diagram of an example of a filter adopted when the word-level vectors are transformed into the phrase-level vector. In the example, word-level vectors X1, X2 and X3 are inputted and a phrase-level vector P1 is outputted. In FIG. 3, each black dot represents one element of the vectors. It should be understood that, the number of black dots is only used to schematically represent a relationship between the vector and a dimension of the filter, instead of the actual number. In addition, two filters (respectively represented with the oblique-line block and the dot block) are shown by the convolutional layer and the downsampling layer in FIG. 2, to obtain sufficient variants and improve the accuracy of the learning. However, it is not limited thereto. For example, only one group of the phrase-level vectors may be adopted. Although FIG. 3 shows an instance of the present disclosure, it can be appreciated by those skilled in the art that, a convolution operation may be performed on word-level vectors in any form, for example, the convolution operation is performed respectively in different dimensions of the word-level vectors.

It can be seen that, in the conventional sentence classification method based on the neural network, only a correlation between adjacent words is considered, and it is difficult to capture global information of a sentence and a correlation between words which are far away from each other instead of being adjacent to each other. In an embodiment of the present disclosure, a neural network based on an attention model is proposed. The attention model can reflect the global information of the sentence and the correlation between the words which are not adjacent to each other. An obtained attention parameter between words in a sentence is large if a correlation between the words is high, and the obtained attention parameter between the words in the sentence is small if the correlation between the words is low. In this case, a key word in the sentence is highlighted and a non-key word is weakened, thereby improving the accuracy of the sentence classification.

In particular, for each of words in a sentence, the calculating unit 101 calculates an attention parameter between the word and each of one or more of other words in the sentence. The attention parameter reflects a correlation between the word and other words in the sentence. The calculation of the attention parameter and intermediate variables involved in the calculation construct an attention model herein. When training, the training unit 102 further uses information reflected by the attention parameters in addition to the real vectors of the words.

Figure 4:
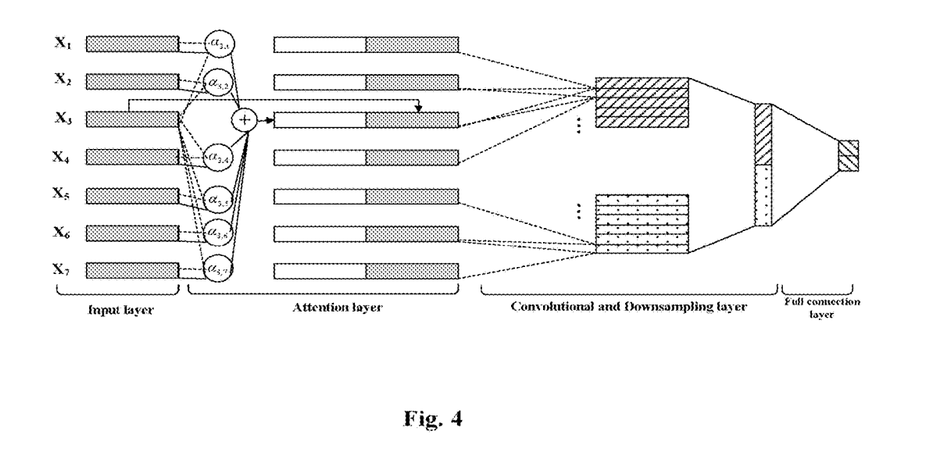
FIG. 4 illustrates an example of a model used in sentence classification based on a convolutional neural network according to an embodiment of the present disclosure.

Still taking the convolutional neural network as an example, FIG. 4 shows an example of a model used in sentence classification based on ATT-CNN according to an embodiment of the present disclosure. The real vectors, X1, X2, . . . , X7, of the words shown in FIG. 2 are still taken as an example. It can be seen that, compared with FIG. 2, an attention layer is added between the input layer and the convolutional layer in the model according to the present disclosure. The attention layer includes information on an attention parameter between each of the words and each of other words in the sentence ($\alpha_{3,1}, \alpha_{3,2}, \ldots \alpha_{3,7}$ are shown in FIG. 4 as an example). Therefore, this is equivalent to adding global information of the sentence to an input vector. It should be noted that, in the example shown in FIG. 4, an attention parameter between a word and each of all the other words in the sentence is calculated. Alternatively, an attention parameter between the word and each of a portion of the other words in the sentence may be calculated. Exemplarily, the portion of the other words at least includes one word which is not adjacent to the word. In the example, the training unit 102 is configured to calculate, for each of the words, a context vector of the word based on the attention parameter corresponding to the word, where the context vector is a sum of real vectors of the corresponding words in the sentence which are weighted by normalized attention parameters. Moreover, the training unit 102 is configured to train by using an extended word vector acquired by combining the real vector of each of the words in the sentence and the context vector of the word. The way of the combining may be concatenating, adding or the like. Although FIG. 4 shows an instance of the present disclosure, it can be appreciated by those skilled in the art that, a convolution operation may be performed between the vectors of the words in any form. For example, the convolution operation may be performed respectively in different dimensions of the vectors of the words. Moreover, the attention model is not limited to be applied to the convolutional neural network, it can be appreciated by those skilled in the art that the attention model can be applied to any neural network such as a recurrent neural network.

An example in which the way of concatenating is adopted is shown in FIG. 4. In this case, the extended word vector obtained in the attention layer includes two parts, one of which is a copy of a vector of the corresponding word and the other of which is a context vector of the word. The extended word vector, instead of the word vector described above, is inputted to the neural network for training. For example, the extended word vector of the t-th word, $X_t$, may be represented as $X_t' = [X_t; ctx_t]$. In another aspect, in a case that the way of adding is adopted, the extended word vector of the t-th word, $X_t$, may be represented as $X_t' = X_t + ctx_t$.

Exemplarily, a context vector $ctx_t$ of the t-th word may be calculated according to the following equation (1):

$$ctx_t = \sum_{i \neq t} \alpha_{t,i} x_i \qquad (1)$$

where $\alpha_{t,i}$ represents a normalized value of an attention parameter between the t-th word and an i-th word. For example, the normalized value may be calculated according to the following equation (2).

$$\alpha_{t,i} = \frac{\exp(\text{score}(x_t, x_i))}{\sum_{i'} \exp(\text{score}(x_t, x_{i'}))} \qquad (2)$$

where, the function "score" represents the attention parameter according to the present disclosure, and is a function measuring a correlation between the t-th word and the i-th word. It may be obtained in multiple calculation ways. For example, the following equation (3) may be adopted.

$$\text{score}(X_t, X_i) = X_t \cdot X_i \tag{3}$$

Or, the following equation (4) or (5) may be adopted.

$$\text{score}(X_t, X_i) = X_t \cdot W_a \cdot X_i \tag{4}$$

$$\text{score}(X_t, X_i) = \chi_a^T \tan h(W_a[X_t; X_i]) \tag{5}$$

Figure 5:
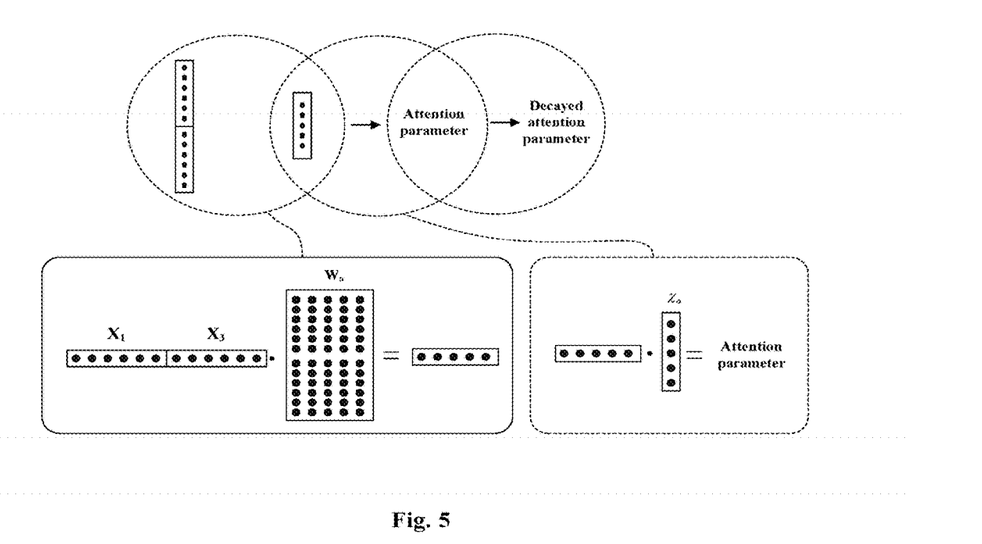
FIG. 5 illustrates a schematic process of obtaining an attention parameter.

FIG. 5 shows an exemplary process of obtaining the attention parameter in a case that the attention parameter is calculated according to the equation (5). In FIG. 5, a case of calculating an attention parameter between a vector X1 and a vector X3 is shown as an example. A decayed attention parameter shown in FIG. 5 is calculated according to the equation (6).

It should be noted that, although an example of the calculation for the attention parameter is given above, it is not limited thereto. The calculation of the function "score" may be considered to construct a feedforward neural network having a hidden layer with the parameters $W_a$, or $W_a$ and $\chi_a$ in the case of adopting the equation (4) or (5). The hidden layer and the layers of the neural network may be trained jointly.

Figure 6:
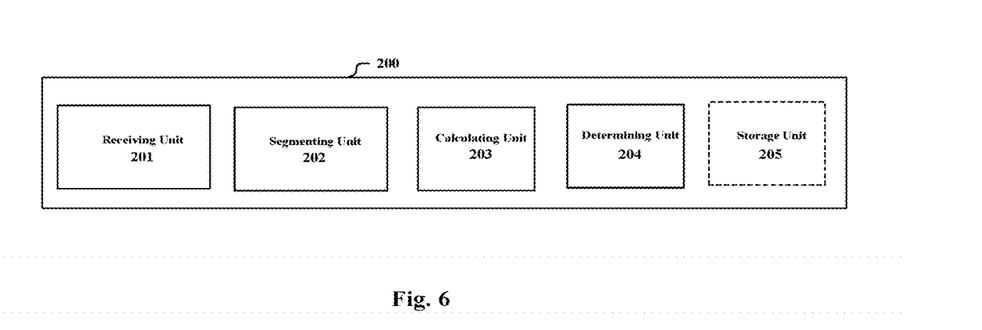
FIG. 6 illustrates a functional structure block diagram of an electronic device for natural language processing according to an embodiment of the present disclosure.

Accordingly, an electronic device 200 for natural language processing is further provided according to the present disclosure. As shown in FIG. 6, the electronic device 200 includes a receiving unit 201, a segmenting unit 202, a calculating unit 203 and a determining unit 204. The receiving unit 201 is configured to receive a sentence. The segmenting unit 202 is configured to segment the sentence into a plurality of word vectors. The calculating unit 203 is configured to, for each of the word vectors, obtain an attention parameter representing correlation between the word vector and each of one or more of other word vectors. The determining unit 204 is configured to determine, based on the attention parameters of the plurality of word vectors, an attention model of the sentence. Similarly, each of the receiving unit 201, the segmenting unit 202, the calculating unit 203 and the determining unit 204 may be implemented in a way of executing corresponding computer instructions by a processor, and in practical, may also be implemented with a programmable logical device, hardware or firmware.

The receiving unit 201 may, for example, receive a sentence to be processed via various user interfaces or communication components. The segmenting unit 202 may segment the sentence into a plurality of word vectors by means of various segmenting tools and mapping tools (word embedding tools). The calculating unit 203 has a structure and function similar to that of the calculating unit 101 described with reference to FIG. 1, and is not repeated here any more. The determining unit 204 constructs the attention model of the sentence based on the calculated attention parameters. The attention model includes, for example, a calculation way of the attention parameter and intermediate parameters that may be involved in the calculation.

Figure 7:
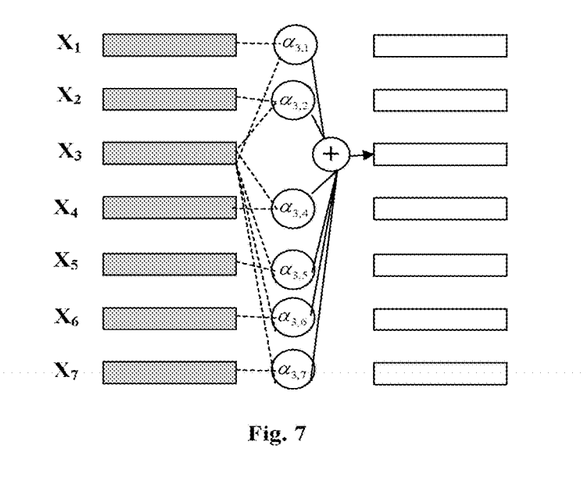
FIG. 7 illustrates a schematic diagram for constructing an attention model of a sentence.

FIG. 7 is a schematic diagram for constructing an attention model of a sentence by the electronic device 200. Seven word vectors X1, X2, . . . , X7 are obtained through the segmentation of the segmenting unit 202. In FIG. 7, only the vector X3 is taken as an example to show a process of constructing the attention model, and other vectors can be by analogy. In a case that the attention parameter is calculated in the way shown in FIG. 5, the attention model may further include the intermediate parameters such as $W_a$ and $\chi_a$ used in the calculation. The calculation for the attention parameter has already been described in detail hereinbefore, and is not repeated here any more.

In an example, the calculating unit 203 is further configured to decay the attention parameter based on a distance between the words related to the attention parameter in the sentence.

In addition, as shown in a dashed-line block in the FIG. 6, the electronic device 200 may further include a storage unit 205 configured to store the attention model described above. The storage unit 205 may be implemented by for example a storage such as a non-volatile memory.

Although the above presents the way of calculating the context vector based on the attention parameter, the present disclosure is not limited thereto. The context vector may be calculated based on the real vector of the word and real vectors of one or more words of other words in a sentence. For example, the context vector may be obtained by summing the real vectors of the one or more words of the other words. Alternatively, the context vector may be calculated by setting the normalized attention parameter $\alpha_{t,i}$ described above as a constant value. After the context vector is obtained, the context vector can be combined with the real vector of the word in various ways such as concatenating or adding, to obtain an extended word vector.

Further, when calculating the context vector, the training unit 102 may further consider the affect of a distance between the words. For example, the training unit 102 may be configured to decay the attention parameter based on a distance between words related to the attention parameter.

Exemplarily, a configuration as follows is possible: the longer the distance is, the more the corresponding attention parameter is decayed. This is because, generally, there is low possibility that a word far away from a current word is related to the current word. The effect of noise information introduced when a sentence becomes long can be reduced effectively by decaying. Thereby, this configuration is especially advantageous for the long sentence.

For example, the training unit 102 may decay the attention parameter using an exponential function with a predetermined decaying factor as a base and a distance as an exponent, as shown in the following equation (6).

$$\text{score}(X_t, X_i)' = (1-\lambda)^k \cdot \text{score}(X_t, X_i) \tag{6}$$

where $\lambda$ is a predetermined decaying factor, $\lambda \in [0,1)$ and $k=|t-i|-1$. It can be seen that, in a case that the predetermined decay factor is close to 0, a context in a wide range may be taken into consideration. On the contrary, in a case that the predetermined decay factor is close to 1, only a context in a local range is taken into consideration. The range of the context to be considered may be adjusted by adjusting the predetermined decaying factor. The processing for decaying the attention parameter for example is shown in a last dashed-line circle in FIG. 5.

The predetermined decaying factor may be specified by a user in advance. Alternatively, the predetermined decaying factor may be a part of the attention model (i.e. be a parameter involved in the calculation of the attention parameter), and thus the predetermined decaying factor is obtained by training the neural network.

Figure 8:
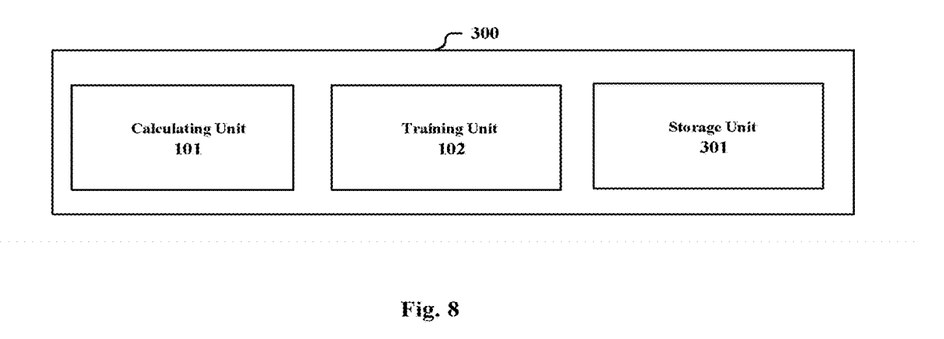
FIG. 8 illustrates another structure block diagram of an electronic device for natural language processing according to an example of the present disclosure.

FIG. 8 is another functional structure block diagram of an electronic device according to an example of the present disclosure. In addition to the units in FIG. 1, the electronic device 300 further includes a storage unit 301 configured to store a trained neural network. And the storage unit 301 may be implemented by, for example, a non-volatile memory.

Besides, the memory unit 301 may further store a trained attention model. For example, in a case that intermediate parameters are involved in the attention model described as above and/or the attention parameter is decayed, the storage unit 301 may be further configured to store at least one of: a parameter involved in the calculation of the attention parameter; and a predetermined decaying factor used when the attention parameter is decayed based on a distance between words related to the attention parameter.

The trained neural network together with the attention model can be stored in the storage unit, so that the stored attention model and the stored neural network can be used directly to classify when confronting with the same type of sentence classifying problem.

It should be understood that, sentence classification is related to different tasks. Therefore, the storage unit 301 may store different attention models and different neural networks for different tasks.

With the electronic devices 100 to 300 according to the embodiments, global information of the sentence is introduced to the conventional neural network. In this case, the semantics of the sentence can be completely reflected, thereby improving the performance of the sentence classification without introducing more external information.

<Second Embodiment>

Figure 9:
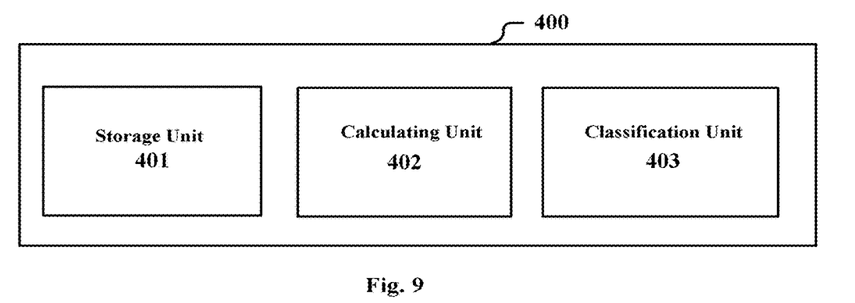
FIG. 9 illustrates a functional structure block diagram of an electronic device for natural language processing according to an embodiment of the present disclosure.

FIG. 9 is a functional structure block diagram of an electronic device 400 for natural language processing according to an embodiment of the present disclosure. The electronic device 400 includes a storage unit 401, a calculating unit 402 and a classification unit 403. The storage unit 401 is configured to store a trained neural network for sentence classification, wherein the neural network is, for example, trained by using the electronic device according to the first embodiment. The calculating unit 401 is configured to, for each of words obtained by segmenting a sentence to be classified, obtain an attention parameter between the word and each of one or more words of other words in the sentence, wherein each of the words is represented by a real vector. The classification unit 403 is configured to classify the sentence by using the above neural network, based on each of the words in the sentence and information on an attention parameter obtained for the word. The respective units may be implemented in a way of executing corresponding computer instructions by a processor. In practical, the respective units may also be implemented with a programmable logical device, hardware or firmware.

For example, after the words obtained by segmenting a sentence to be classified are transformed into real vectors via a mapping tool such as word2vec, the calculating unit 402 calculates attention parameters between each of the words and other words in the sentence based on these real vectors. It should be understood that, the mapping tool and a calculation manner of the attention parameter which are used here should be the same as the mapping tool and the calculation manner used in training the neural network.

For example, the function "score" may be calculated as an attention parameter, according to one of equations (3) to (5) in the first embodiment. In a case that the attention parameter is calculated according to the equation (4) or (5), the calculating unit 402 further calculates the attention parameter by using a trained intermediate parameter used for the calculation of the attention parameter, which is stored in the storage unit 401. The intermediate parameter and the neural network are jointly trained. In other words, the storage unit 401 further stores a trained attention model.

After the function "score" is calculated, the calculating unit 402 may normalize the attention parameters for example according to the equation (2), calculate a context vector of each of the words according to the equation (1), and combine the context vector with the corresponding word to obtain an extended word vector. The context vector and the combination manner are described in detail in the first embodiment, which are not repeated here any more.

In an example, the classification unit 403 may be further configured to weight the real vectors of corresponding words in the sentence with the normalized attention parameters and sum them to obtain a context vector of the word; concatenate the real vector of the word and the context vector of the word to obtain an extended word vector; and classify the sentence using the neural network based on the extended word vector of each of the words in the sentence.

A way of calculating the normalized attention parameter and a way of obtaining the extended word vector should be the same as the ways used in training the neural network, which have been described in detail in the first embodiment and are not repeated here any more.

In addition, in anther example, the calculating unit 402 may further decay the attention parameter based on a distance between words related to the attention parameter in the sentence. A way of decaying may be that, the longer the distance is, the more the corresponding attention parameter is decayed. This is because there is no close correlation between words far away from each other. For example, the attention parameter may be decayed using an exponential function with a predetermined decaying factor as a base and a distance as an exponent.

The predetermined decay factor may be specified manually by a user. Alternatively, the predetermined decaying factor may be obtained in a training process and stored in the storage unit 401.

Accordingly, an electronic device for natural language processing is further provided according to the present disclosure. The electronic device includes: a receiving unit, configured to receive a sentence; a segmenting unit, configured to segment the sentence into a plurality of word vectors; a storage unit, configured to store an attention model, where the attention model is trained with the training method according to the first embodiment; a acquisition unit, configured to acquire the attention model stored in the storage unit; a calculating unit, configured to process based on the attention model to obtain an attention parameter of each of the word vectors and generate a corresponding extended word vector based on each of word vectors and an attention parameter for the word vector; and a classification unit, configured to classify with respect to the extended word vector to obtain classification information of the sentence. Each of the receiving unit, the segmenting unit, the acquisition unit, the calculating unit and the classification unit may be implemented in a way of executing corresponding computer instructions by a processor. In practical, each of the receiving unit, the segmenting unit, the acquisition unit, the calculating unit and the classification unit may be implemented with a programmable logical device, hardware or firmware. The storage unit may be implemented by a storage such as a non-volatile memory.

In an example, the storage unit may be further configured to store classification information of the sentence.

For convenience of understanding, performance of classifying sentences in different corpus by using the electronic device 400 described above is given below. In addition, performance of classifying the sentences using other techniques is also given for comparison.

Figure 10:
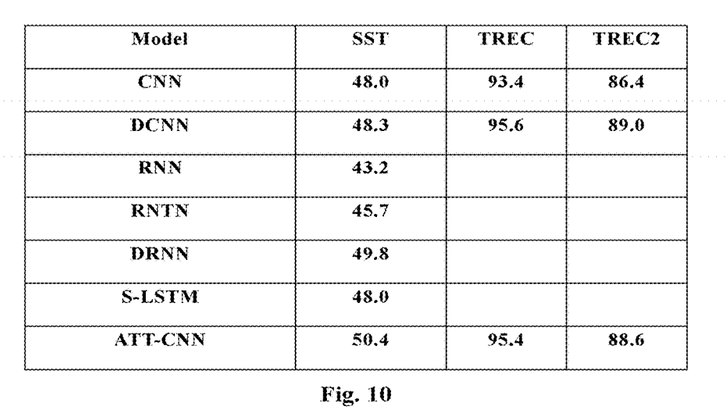
FIG. 10 illustrates a comparison of the performance when using different models to classify sentences in a public corpus.

FIG. 10 shows a comparison between performance of using different models to classify sentences in public data including a Standford Sentiment Treebank corpus (SST, created by Socher etc in 2013), a TREC (created by Li and Roth in 2002) corpus and a TREC2 (created by Li and Roth in 2002, having finer categories as compared with TREC) corpus. The calculation is performed by using word vectors mapped by word2vec.

Numeral values shown in FIG. 10 are percentages of correct classification results in a case that models in a corresponding row are used to classify sentences in corpus in a corresponding column. In addition to the basic CNN model, a variant of the CNN model, DCNN, is compared with the ATT-CNN model according to the present disclosure. In the DCNN, a continuous n-gram context convolution is replaced with dependency n-gram context convolution. Besides, a recursive neural network (RNN) and improved versions, RNTN and DRNN, of the RNN are further included. S-LSTM is a model based on a variant of recurrent neural network, LSTM. Descriptions for the models may be obtained in the prior art, which are not described in detail here any more.

It can be seen that, for each corpus, performance of the ATT-CNN model according to the present disclosure is better than performance of the basic CNN model. It indicates that an attention mechanism introduced in the ATT-CNN model according to the present disclosure can capture significant semantics efficiently, thereby improving the performance of sentence classification. In addition, compared with other types of models, the performance of the ATT-CNN model according to the present disclosure has advantages for a particular corpus. In other words, the performance of the ATT-CNN model according to the present disclosure can be at least comparable to the performance of other types of models. However, the ATT-CNN model according to the present disclosure has a simpler structure and a lower complexity compared with the other types of models.

In addition, the models above are also used to classify sentences in an internal database. Similarly, the performance of the ATT-CNN model is better than that of the CNN model. For example, an accuracy obtained with the ATT-CNN model is 94.6% and an accuracy obtained with the CNN model is 93.6%.

Figure 11:
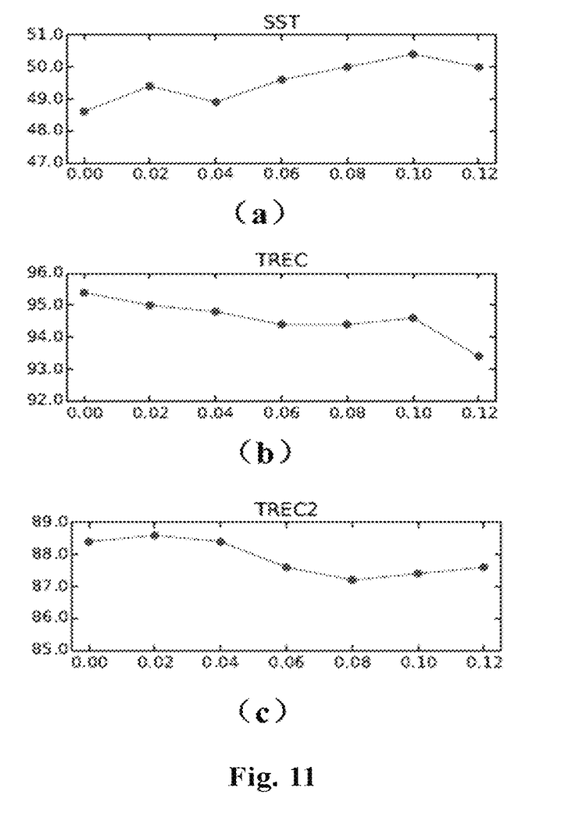
FIG. 11 illustrates graphs of the classification performance obtained when using the model according to the present disclosure to classify sentences in different corpus based on different predetermined decaying factors.

(a) to (c) in FIG. 11 show graphs of classification performance obtained in a case that the ATT-CNN models according to the present disclosure having different predetermined decaying factors are used to classify sentences in the SST corpus, the TREC corpus and the TREC2 corpus respectively. In FIG. 11, a horizontal axis represents the predetermined decaying factor $\lambda$ shown in the equation (6), and a vertical axis represents the accuracy of the classification.

It can be seen that, as for the TREC corpus and TREC2 corpus, even a small predetermined decaying factor may cause significant performance degradation. In contrast, as for the SST corpus, the performance is improved in a case that the decaying factor is increased. This is because that the sentences in the corpus TREC and TREC2 are shorter (an average length of the sentence is 10), the sentences in the SST corpus are longer (an average length of the sentence is 19). The possibility that words far away from each are correlated is low in a case that the sentence is long. Therefore, for a long sentence in the SST corpus, the setting of the predetermined decaying factor can effectively filter out the effect of noise caused by the long sentence.

Figure 12:
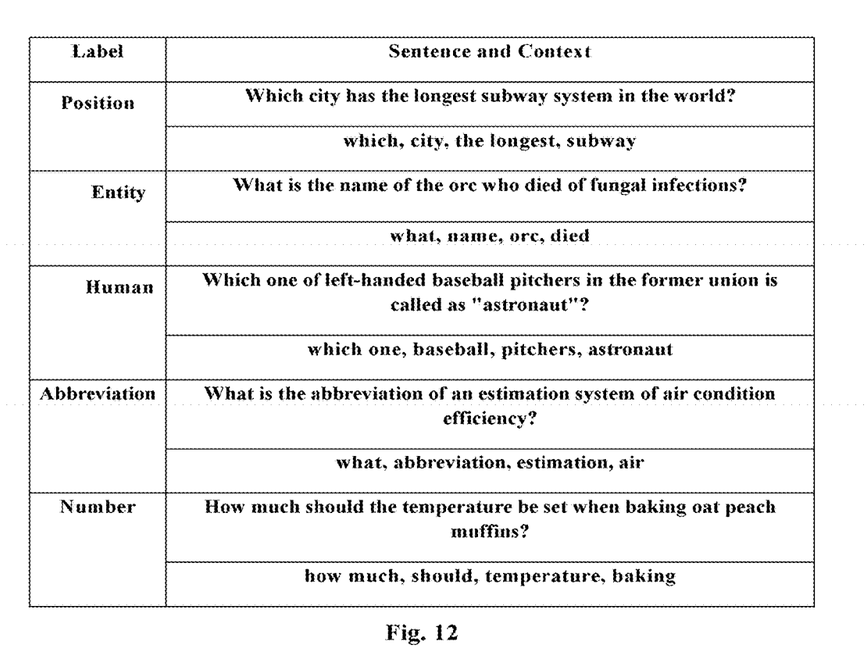
FIG. 12 illustrates examples how an attention model according to the present disclosure captures the correlation between words in a sentence.

In addition, FIG. 12 shows how an attention model in the ATT-CNN model according to the present disclosure captures the correlation between words in a sentence. Examples listed in FIG. 12 come from the TREC corpus. For each of the sentences, contexts of each word are ordered based on the normalized attention parameter $\alpha_{t,i}$, the context among all of the words which is arranged on the top by the frequency are selected and listed below the sentence. It can be seen that, the listed contexts which are most significant and captured with ATT-CNN model can accurately reflect category information of the sentence.

With the electronic device according to the present disclosure, global information of the sentence is considered when performing sentence classification, thereby effectively improving the performance of the sentence classification.

<Third Embodiment>

It is apparent that some processing or methods are also disclosed in the description above on the electronic device for nature language processing according to embodiments of the present invention. Below, the summary of the methods is described without repeating the details which are already discussed above, however, it should be noted that although disclosed in the description of the electronic device for nature language processing the methods do not certainly employ or are not certainly executed by the aforementioned components. For instance, embodiments of the electronic device for nature language processing may be partially or completely achieved by hardware and/or firmware, and the method for nature language processing described below may be fully achieved by a computer-executable program, although the methods may employ the hardware and/or firmware of the electronic device for nature language processing.

Figure 13:
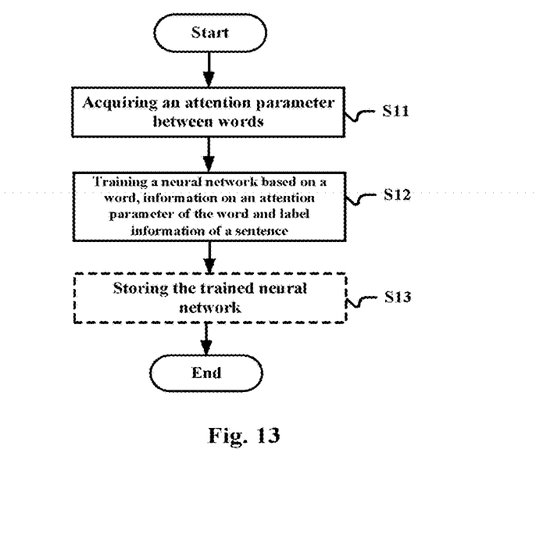
FIG. 13 illustrates a flowchart of a training method for natural language processing according to an embodiment of the present disclosure.

FIG. 13 shows a flowchart of a training method of an electronic device for natural language processing according to an embodiment of the present disclosure. The method includes: for each of words obtained by segmenting a sentence in a training data set, obtaining an attention parameter representing correlation between the word and each of one or more words of other words in the sentence respectively (S11), wherein each of the words is represented by a real vector; and training, based on each of the words in each of the sentences, information on the attention parameter obtained for the word and label information of the sentence in the training data set, a neural network for sentence classification (S12).

The segmentation of the sentence and the mapping to the real vector can be implemented with any existing technology or any technology to be developed. In step S11, the attention parameter may be calculated in many manners, as long as a result reflecting the correlation between words in the sentence can be obtained using the manner to be adopted. A specific example has been given in the first embodiment and is not described here repeatedly any more.

In step S12, for each of the words, a context vector of the word is calculated with the attention parameter corresponding to the word, where the context vector is a sum of real vectors of the corresponding words in the sentence which are weighted by normalized attention parameters. And in step S12, an extended word vector, which is obtained by combining the real vector of each of the words and the context vector of the word, can further be used in training.

In addition, the attention parameter may be decayed based on a distance between words related to the attention parameter. For example, the longer the distance is, the more the corresponding attention parameter is decayed. As an example, the attention parameter may be decayed using an exponential function with a predetermined decaying factor as a base and the distance as an exponent. The predetermined decaying factor may be specified in advance or may be obtained through training the neural network.

In an example, the neural network and an intermediate parameter involved in calculating the attention parameter are jointly trained in step S12.

As shown by a dashed-line box in FIG. 13, the above method may further include a step S13: storing a trained neural network. In addition, in step S13, at least one of the following can be further stored: a parameter involved in calculating the attention parameter; a predetermined decaying factor used in decaying the attention parameter based on a distance between the words related to the attention parameter.

Figure 14:
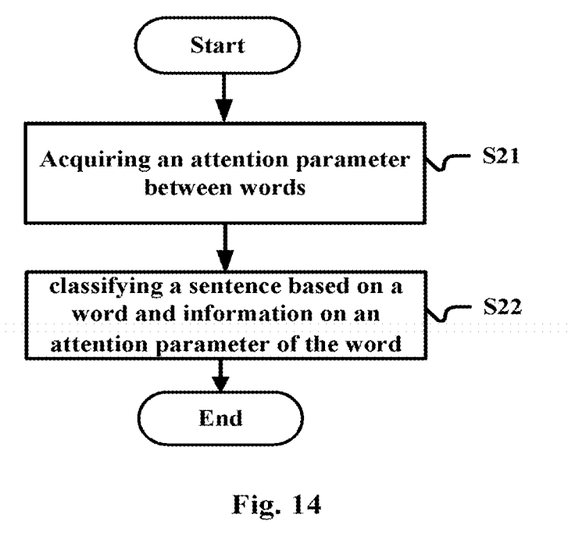
FIG. 14 illustrates a flowchart of a method for natural language processing according to an embodiment of the present disclosure.

FIG. 14 shows a method for natural language processing according to an embodiment of the present disclosure. The method includes: for each of words obtained by segmenting a sentence to be classified, obtaining an attention parameter representing correlation between the word and each of one or more words of other words in the sentence (S21), where each of the words is represented by a real vector; and classifying the sentence with the neural network, based on each of the words in the sentence and information on the attention parameter acquired for the word (S22), where the neural network is trained with the training method described above.

The real vector mapping tool, the way of calculating the attention parameter and the like used in this method should be the same as those used in training the neural network.

In an example, step S21 further includes calculating the attention parameter based on the intermediate parameter stored in the storage, which has been trained for calculating the attention parameter, where the intermediate parameter and the neural network are jointly trained.

Figure 15:
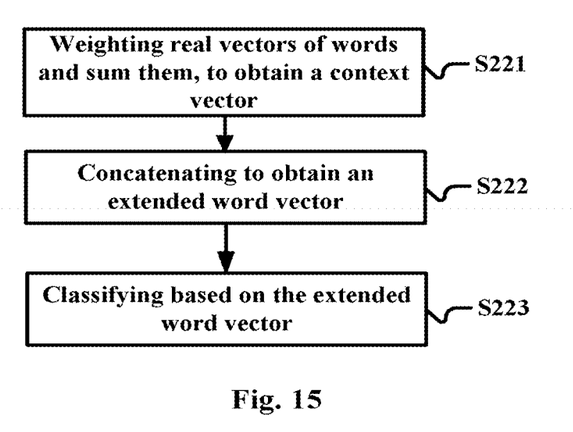
FIG. 15 illustrates a flowchart of sub-steps of step S22 in FIG. 14.

As shown in FIG. 15, the step S22 may include sub-steps: weighting the real vectors of the corresponding words with normalized attention parameters and summing them, to obtain a context vector of the word (S221); combining the real vector of the word and the context vector of the word, to obtain an extended word vector (S222); and classifying the sentence with the neural network, based on the extended word vector of each of the words in the sentence (S223).

In an example, in step S21, the attention parameter may be decayed based on a distance between words related to the attention parameter in the sentence. For example, the longer the distance is, the more the corresponding attention parameter is decayed. Exemplarily, the attention parameter may be decayed using an exponential function with a predetermined decaying factor as a base and the distance as an exponent.

The predetermined decaying factor may be specified by a user, or may be obtained during the training process and stored in the storage.

In the method for natural language processing according to the present disclosure, global information of the sentence is introduced to a conventional neural network, thereby classifying the sentence more accurately.

It should be noted that, the above methods may be combined or used separately, the details of which are described in detail in the first embodiment to second embodiment and are not repeated here any more.

The basic principle of the present invention has been described above in conjunction with particular embodiments. However, as can be appreciated by those ordinarily skilled in the art, all or any of the steps or components of the method and apparatus according to the invention can be implemented in hardware, firmware, software or a combination thereof in any computing device (including a processor, a storage medium, etc.) or a network of computing devices by those ordinarily skilled in the art in light of the disclosure of the invention and making use of their general circuit designing knowledge or general programming skills.

Moreover, the present invention further discloses a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the present invention. The memory medium includes but is not limited to soft disc, optical disc, magnetic optical disc, memory card, memory stick and the like.

In the case where the present application is realized by software or firmware, a program constituting the software is installed in a computer with a dedicated hardware structure (e.g. the general computer 1600 shown in FIG. 16) from a storage medium or network, wherein the computer is capable of implementing various functions when installed with various programs.

Figure 16:
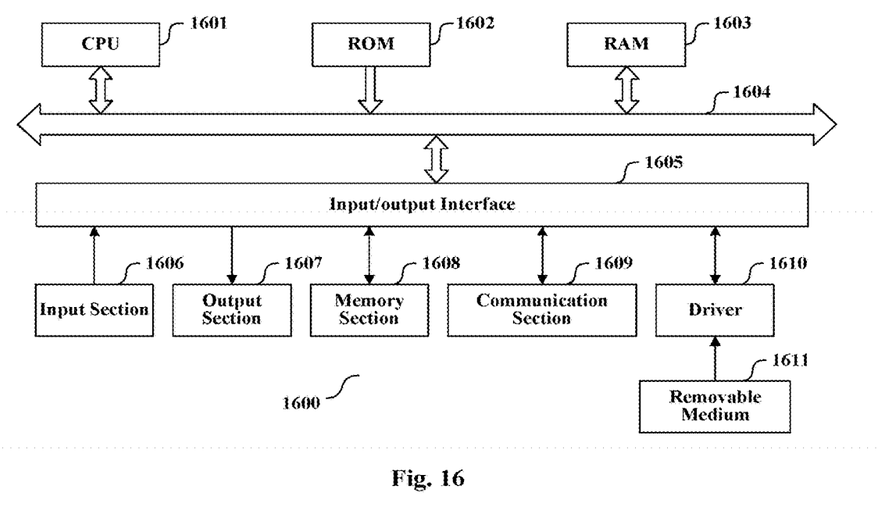
FIG. 16 is an exemplary block diagram illustrating the structure of a general purpose personal computer capable of realizing the method and/or apparatus and/or system according to the embodiments of the present invention.

In FIG. 16, a central processing unit (CPU) 1601 executes various processing according to a program stored in a read-only memory (ROM) 1602 or a program loaded to a random access memory (RAM) 1603 from a memory section 1608. The data needed for the various processing of the CPU 1601 may be stored in the RAM 1603 as needed. The CPU 1601, the ROM 1602 and the RAM 1603 are linked with each other via a bus 1604. An input/output interface 1605 is also linked to the bus 1604.

The following components are linked to the input/output interface 1605: an input section 1606 (including keyboard, mouse and the like), an output section 1607 (including displays such as a cathode ray tube (CRT), a liquid crystal display (LCD), a loudspeaker and the like), a memory section 1608 (including hard disc and the like), and a communication section 1609 (including a network interface card such as a LAN card, modem and the like). The communication section 1609 performs communication processing via a network such as the Internet. A driver 1610 may also be linked to the input/output interface 1605, if needed. If needed, a removable medium 1611, for example, a magnetic disc, an optical disc, a magnetic optical disc, a semiconductor memory and the like, may be installed in the driver 1610, so that the computer program read therefrom is installed in the memory section 1608 as appropriate.

In the case where the foregoing series of processing is achieved through software, programs forming the software are installed from a network such as the Internet or a memory medium such as the removable medium 1611.

It should be appreciated by those skilled in the art that the memory medium is not limited to the removable medium 1611 shown in FIG. 16, which has program stored therein and is distributed separately from the apparatus so as to provide the programs to users. The removable medium 1611 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 1602 and the memory section 1608 in which programs are stored, and can be distributed to users along with the device in which they are incorporated.

To be further noted, in the apparatus, method and system according to the invention, the respective components or steps can be decomposed and/or recombined. These decompositions and/or recombinations shall be regarded as equivalent solutions of the invention. Moreover, the above series of processing steps can naturally be performed temporally in the sequence as described above but will not be limited thereto, and some of the steps can be performed in parallel or independently from each other.

Finally, to be further noted, the term "include", "comprise" or any variant thereof is intended to encompass nonexclusive inclusion so that a process, method, article or device including a series of elements includes not only those elements but also other elements which have been not listed definitely or an element(s) inherent to the process, method, article or device. Moreover, the expression "comprising a(n) . . . " in which an element is defined will not preclude presence of an additional identical element(s) in a process, method, article or device comprising the defined element(s)" unless further defined.

Although the embodiments of the invention have been described above in detail in connection with the drawings, it shall be appreciated that the embodiments as described above are merely illustrative but not limitative of the invention. Those skilled in the art can make various modifications and variations to the above embodiments without departing from the spirit and scope of the invention. Therefore, the scope of the invention is defined merely by the appended claims and their equivalents.

The invention claimed is:

1. An electronic device for natural language processing, comprising:
   a processor configured to:
      for each of words obtained by segmenting a sentence in a training data set, determine attention parameters representing correlation between the word and each of other words in the sentence, wherein the words are represented by respective word vectors;
      for each of the words, determine a context vector based on a sum of the word vectors of the other words in the sentence that are weighted based on the corresponding attention parameters; and
      determine parameters of a trained neural network by training a neural network, based on label information of the sentence in the training data set, the word vectors, and context vectors for the words, the trained neural network being configured by the determined parameters to perform sentence classification on another sentence.

2. The electronic device according to claim 1, wherein the context vector for a particular word is the sum of word vectors of the other words in the sentence which are weighted using normalized attention parameters.

3. The electronic device according to claim 2, wherein the processor is configured to train the neural network using an extended word vector corresponding to the particular word in the sentence obtained by combining the word vector of the particular word in the sentence and the context vector of the particular word.

4. The electronic device according to claim 2, wherein the processor is further configured to determine a particular attention parameter by decaying a corresponding baseline attention parameter based on a distance between at least two words related to the particular attention parameter in the sentence.

5. The electronic device according to claim 4, wherein the processor is configured to decay the corresponding baseline attention parameter more in a case that the distance is longer.

6. The electronic device according to claim 4, wherein the processor is configured to decay the corresponding baseline attention parameter using an exponential function with a decaying factor as a base and the distance as an exponent.

7. The electronic device according to claim 6, wherein the decaying factor is specified in advance or obtained by training the neural network.

8. The electronic device according to claim 1, wherein the processor is configured to jointly train the neural network and an intermediate parameter involved in calculating the attention parameters.

9. The electronic device according to claim 1, further comprising:
   a storage configured to store the determined parameters of the trained neural network.

10. The electronic device according to claim 9, wherein the storage is further configured to store at least one of:
    an intermediate parameter involved in calculating the attention parameter; or
    a decaying factor used in determining a particular attention parameter by decaying a corresponding baseline attention parameter based on a distance between at least two words related to the attention parameter in the sentence.

11. The electronic device for natural language processing according to claim 9, wherein the processor is further configured to:
    for each of second words obtained by segmenting the another sentence to be classified, obtain second attention parameters representing correlation between the second word and each of other second words in the another sentence, wherein the second words are represented by respective second word vectors; and
    classify the another sentence by using the neural network, based on each of the second words in the another sentence and the second attention parameters obtained for the second words.

12. The electronic device according to claim 11, wherein the storage is configured to store an intermediate parameter, the intermediate parameter and the neural network being jointly trained, and
    the processor is further configured to calculate the second attention parameters based on at least the intermediate parameter stored in the storage.

13. The electronic device according to claim 11, wherein, the processor is further configured to:
    for a particular word of the second words in the another sentence,
       determine a second context vector based on a sum of the second word vectors of the other words in the another sentence that are weighted based on normalized second attention parameters, and
       combine the second word vector of the particular word and the second context vector of the particular word to obtain an extended word vector corresponding to the particular word of the second words in the another sentence; and
    classify the another sentence by using the neural network, based on at least the extended word vector corresponding to the particular word of the second words in the another sentence.

14. The electronic device according to claim 13, wherein the processor is further configured to determine a particular second attention parameter by decaying a corresponding baseline second attention parameter based on a distance between at least two second words related to the particular second attention parameter in the another sentence.

15. The electronic device according to claim 14, wherein the processor is configured to decay the corresponding baseline second attention parameter more in a case that the distance is longer.

16. The electronic device according to claim 14, wherein, the processor is configured to decay the corresponding baseline second attention parameter using an exponential function with a decaying factor as a base and the distance as an exponent.

17. The electronic device according to claim 16, wherein the decaying factor is specified by a user, or stored in the storage.

18. A method for natural language processing, comprising:
for each of words obtained by segmenting a sentence in a training data set, determining attention parameters representing correlation between the word and each of other words in the sentence, wherein the words are represented by respective word vectors;
for each of the words, determining a context vector based on a sum of the word vectors of the other words in the sentence that are weighted based on the corresponding attention parameters; and
determining parameters of a trained neural network by training a neural network based on label information of the sentence in the training data set, the word vectors, and context vectors for the words, the trained neural network being configured by the determined parameters to perform sentence classification on another sentence.

19. The method for natural language processing according to claim 18, further comprising:
for each of second words obtained by segmenting the another sentence to be classified, obtained second attention parameters representing correlation between the second word and each of other second words in the another sentence, wherein the second words are represented by respective second word vectors; and
classifying the another sentence by using the neural network, based on each of the second words in the another sentence and the second attention parameters obtained for the second words.

20. An electronic device for natural language processing, comprising:
a processor configured to:
receive a sentence and segment the sentence into a plurality of word vectors; for each of the plurality of word vectors, determine an attention parameter representing correlation between the word vector and each of the other word vectors among the plurality of word vectors;
determine, based on attention parameters of the plurality of word vectors, an attention model of the sentence;
for each of the plurality of word vectors, determine a context vector based on a sum of the other word vectors that are weighted based on the corresponding attention parameters; and
determine parameters of a trained network by training a neural network based on the word vectors and context vectors for the word vectors, the trained neural being configured by the determined parameters to perform sentence classification on another sentence.

21. The electronic device according to claim 20, wherein, the processor is further configured to determine a particular the attention parameter by decaying a corresponding baseline attention parameter based on a distance between at least two words related to the particular attention parameter in the sentence.

22. The electronic device according to claim 20, further comprising a storage configured to store the attention model and the determined parameters of the neural network.

23. The electronic device for natural language processing according to claim 20, wherein the processor is further configured to:
receive the another sentence and segment the another sentence into a plurality of second word vectors;
determine, based on the attention model stored in the storage, a corresponding second attention parameter of each of the plurality of second word vectors;
generate, based on each of the second word vectors and the second attention parameter for a particular second word vector, a corresponding extended word vector; and
classify the another sentence by using the neural network based on at least the extended word vector to obtain classification information of the sentence.

24. The electronic device according to claim 23, wherein the storage is further configured to store the classification information of the sentence.

* * * * *